United States Patent
Whittaker et al.

(10) Patent No.: US 12,425,878 B2
(45) Date of Patent: Sep. 23, 2025

(54) USING PHYSICAL AND LOGICAL MODELING OF NETWORK INVENTORY RESOURCES FOR DISCOVERY, ASSIGNMENT AND ACTIVATION

(71) Applicant: AT&T Intellectual Property I, L.P., Atlanta, GA (US)

(72) Inventors: Allison Whittaker, Alpharetta, GA (US); Andrew Mayer, Lake Como, NJ (US); Ernie Bayha, Jackson, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 483 days.

(21) Appl. No.: 17/349,217

(22) Filed: Jun. 16, 2021

(65) Prior Publication Data

US 2022/0408278 A1   Dec. 22, 2022

(51) Int. Cl.
*H04W 24/02* (2009.01)
*H04W 4/50* (2018.01)
*H04W 8/08* (2009.01)
*H04W 24/04* (2009.01)
*H04W 64/00* (2009.01)

(52) U.S. Cl.
CPC ............ *H04W 24/02* (2013.01); *H04W 4/50* (2018.02); *H04W 8/08* (2013.01); *H04W 24/04* (2013.01); *H04W 64/003* (2013.01)

(58) Field of Classification Search
CPC ......... H04W 24/02; H04W 4/50; H04W 8/08; H04W 24/04; H04W 64/003
See application file for complete search history.

(56) References Cited

U.S. PATENT DOCUMENTS

| | | | |
|---|---|---|---|
| 2009/0048943 A1* | 2/2009 | Hardigree | G06Q 30/0605 |
| | | | 705/26.61 |
| 2010/0211662 A1* | 8/2010 | Glendinning | H04Q 3/0083 |
| | | | 707/E17.005 |
| 2011/0275364 A1* | 11/2011 | Austin | H04W 24/04 |
| | | | 455/423 |
| 2017/0257279 A1* | 9/2017 | Mishra | H04L 41/0886 |
| 2017/0308601 A1* | 10/2017 | Massarenti | H04L 41/0816 |
| 2018/0349810 A1* | 12/2018 | Correll | G06Q 10/0635 |

(Continued)

FOREIGN PATENT DOCUMENTS

KR    20150043047 A   *   4/2015   ............ G06Q 50/28

*Primary Examiner* — Michael J Moore, Jr.
(74) *Attorney, Agent, or Firm* — Guntin & Gust, PLC; Louis Yang

(57) ABSTRACT

The technologies described herein are generally directed to modeling network systems. For example, a method described herein can include receiving request data representative of a planning request for a network equipment project applicable to network equipment that is part of a network. Further, based on the request data and a logical inventory model of resources, the method can include identifying a logical process model for the network equipment project, corresponding to characteristics of service equipment applicable to the network equipment project. The method further includes transforming the logical process model into a physical process model that references the service equipment applicable to the network equipment project, and based on the request data and the physical process model, facilitating, for the network equipment project, the service equipment.

20 Claims, 10 Drawing Sheets

(56) References Cited

U.S. PATENT DOCUMENTS

| | | |
|---|---|---|
| 2020/0045519 A1* | 2/2020 | Raleigh ................... H04W 4/08 |
| 2021/0337457 A1* | 10/2021 | Jun ....................... H04W 48/20 |
| 2022/0201447 A1* | 6/2022 | Asawa .................. H04W 24/02 |
| 2022/0239560 A1* | 7/2022 | Hao ...................... H04W 12/63 |
| 2022/0408278 A1* | 12/2022 | Whittaker ............. H04W 24/04 |

* cited by examiner

USING PHYSICAL AND LOGICAL MODELING OF NETWORK INVENTORY RESOURCES FOR DISCOVERY, ASSIGNMENT AND ACTIVATION

TECHNICAL FIELD

The subject application is related to the implementation of networked computer systems and, for example, different approaches to physical and logical modeling of computer systems.

BACKGROUND

As network implementations have continued to increase in complexity and diversity, problems can occur during the planning of such systems and the allocating of computing resources. In telecommunications networks, large inventories of network equipment, complex deployments, and different processes are handled by existing isolated and difficult to modify legacy systems.

These problems are enhanced by the transition to next generation communications systems. Legacy systems often cannot be easily modified to incorporate significant changes to the requirements of different network services.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
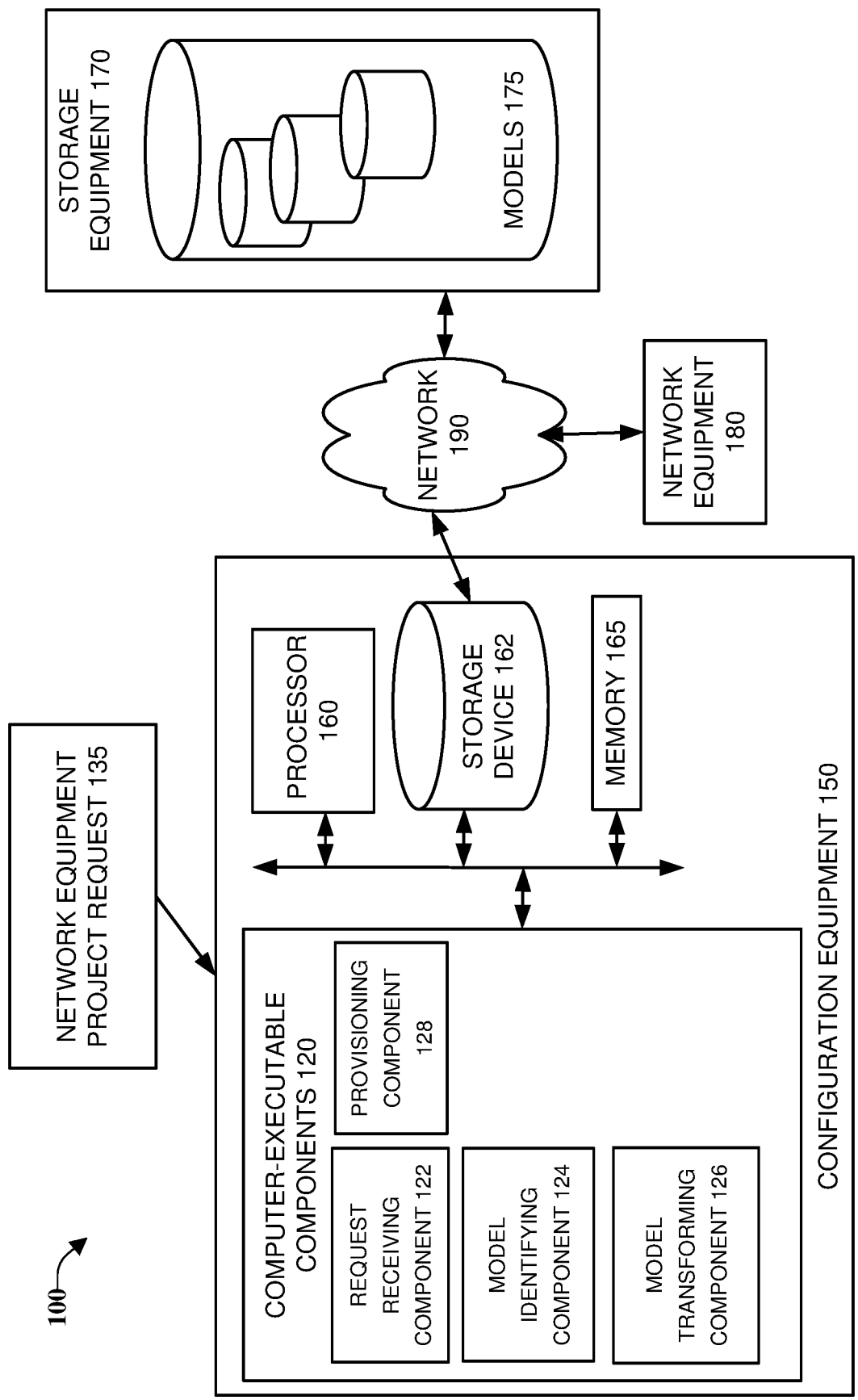
FIG. 1 is an architecture diagram of an example system that can facilitate logical and physical modeling of network equipment, in accordance with one or more embodiments.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate logical and physical modeling of service equipment networks. Different examples that describe these aspects are included with the description of FIGS. 1-10 below. It should be noted that the subject disclosure may be embodied in many different forms and should not be construed as limited to this example or other examples set forth herein.

In at least one implementation, one or more embodiments can be used to facilitate the implementation of parts of a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.). One or more embodiments can facilitate the placement of multiple antennas in a geographic area enabling coverage by networks that include, but are not limited to, communication service provider networks. In exemplary, non-limiting embodiments described herein, simulated groups of antennas can include millimeter wave (mmWave) antennas of a base station of a cellular network, e.g., a fifth generation or other next generation RAN. In certain implementations of types of mmWave antennas, large numbers of antennas are deployed in comparison with the number of other types of antennas that can be employed, e.g., up to and exceeding in some circumstances, one hundred antennas per square mile.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system.

Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., generating and maintaining logical and physical models of complex hardware and software configurations), that are not abstract and cannot be performed as a set of mental acts by a human. For example, a human, or even a plurality of humans, cannot efficiently deploy and configure network equipment in accordance with logical and physical models, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate logical and physical modeling of service equipment networks. It should be noted that the subject disclosure may be embodied in many different forms and should not be construed as limited to this example or other examples set forth herein. The above-described background relating to network hardware is merely intended to provide a contextual overview the elements of one or more embodiments, and is not intended to be exhaustive.

As discussed further below, one or more embodiments can address problems such as those described in the Background section above with inventive concepts that include different approaches to generating and maintaining a model of different inventory items and associated processes.

FIG. 1 is an architecture diagram of an example system 100 that can facilitate logical and physical modeling of network equipment, in accordance with one or more embodiments. For purposes of brevity, description of like elements and/or processes employed in other embodiments is omitted.

As depicted, system 100 can include configuration equipment 150 receiving network equipment project request 135, and communicatively coupled to network equipment 180 and storage equipment 170 via network 190. In one or more embodiments, configuration equipment 150 can include computer executable components 120, processor 160, storage device 162, and memory 165. Storage equipment 170 can include models 175, e.g., described with FIG. 2 below. Computer executable components 120 can include request receiving component 122, model identifying component 124, model transforming component 126, provisioning component 128, and other components described or suggested by different embodiments described herein that can improve the operation of system 100. It is noted that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, configuration equipment 150 can further comprise various computer and/or computing-based elements described herein with reference to operating environment 1000 and FIG. 10.

According to multiple embodiments, network 190 can comprise, but is not limited to, wired and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

According to multiple embodiments, configuration equipment 150 can include memory 165. In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

In some embodiments, memory 165 can store one or more computer and/or machine readable, writable, and/or executable components and/or instructions 120 that, when respectively executed by processor 160, can facilitate performance of operations defined by the executable component(s) and/or instruction(s). Generally, applications (e.g., computer executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining request receiving component 122. As discussed with examples of one or more embodiments below, request receiving component 122 can, in accordance with one or more embodiments, facilitate receiving request data representative of a planning request for a network equipment project applicable to network equipment 180 that is part of a network.

In another example, in one or more embodiments, computer executable components 120 can include instructions that, when executed by processor 160, can facilitate performance of operations defining model identifying component 124. As discussed with FIG. 2 below, model identifying component 124 can, based on the request data and a logical inventory model of resources, identify a logical process model for the network equipment project, with the logical inventory model being accessible via storage equipment, and the logical process model corresponding to characteristics of service equipment applicable to the network equipment project, e.g., characteristics of inventoried equipment that include groups of inventory items by characteristics or by type. One having skill in the relevant art(s), given the description herein, will appreciate the network equipment and network equipment projects that can benefit from implementation using approaches described herein. As used with some examples herein, network equipment can include different resources (e.g., computing resources) that can perform functions in furtherance of the services described herein.

Generally speaking, as described herein, the logical inventory model can provide a data model to support telecom services and inventory, including network topologies. In one or more embodiments, logical inventory model can provide common interfaces to support various network domains and manage relationships among data objects and associated information. For example, the logical inventory model can facilitate identifying and utilizing particular telecom data for a product of a vendor, in a structured and predictable manner. Of further benefit, because the model describes telecom equipment and services, models described herein can align with telecom industry standards, including but not limited to Telemanagement Forum (TMF), Internet Engineering Task Force (IETF), 3rd Generation Partnership Project (3GPP), Open Network Foundation Transport API (ONF TAPI), Open Network Automation Platform (ONAP), and International Telecommunications Union Telecommunication Standardization Sector (ITU-T).

Based on the descriptions herein, one having skill in the relevant art(s) would appreciate different services that can be provided by models 175 discussed herein, including but not limited to, capabilities related to accessing, transforming and exposing data from external systems, direct query language access (e.g., structured query language (SQL)) to external applications is not available, capacity Planning and resource reservation, and tracking network resource capacity. Additional details of the logical inventory model and other models 175 are discussed with FIG. 2 below.

In additional embodiments, computer executable components 120 can include instructions that, when executed by processor 160, can facilitate performance of operations defining model transforming component 126. As discussed with FIG. 2 below, model transforming component 126 can, in accordance with one or more embodiments, transform, by the configuration equipment, the logical process model into a physical process model that references the service equipment applicable to the network equipment project.

In additional embodiments, computer executable components 120 can include instructions that, when executed by processor 160, can facilitate performance of operations defining provisioning component 128. As discussed with FIG. 2 below, provisioning component 128 can, in accordance with one or more embodiments, based on the request data and the physical process model, provision the service equipment for the network equipment project.

It is noted that the embodiments of the subject disclosure depicted in various figures disclosed herein are for illustration only, and as such, the architecture of such embodiments are not limited to the systems, devices, and/or components depicted therein. For example, in some embodiments, configuration equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
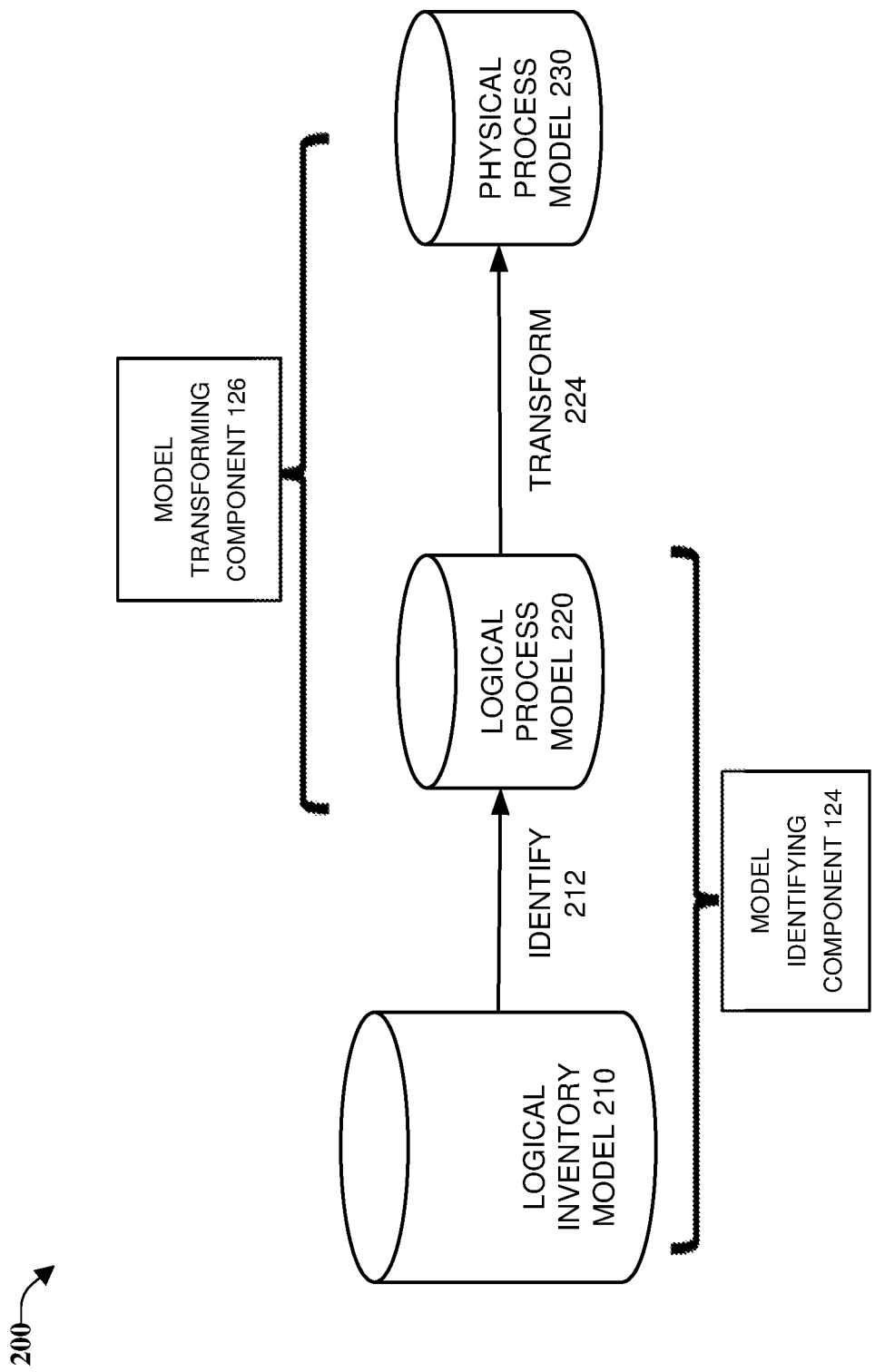
FIG. 2 is a diagram of a non-limiting example system that can facilitate logical and physical modeling of network equipment, in accordance with one or more embodiments.

FIG. 2 is a diagram of a non-limiting example system 200 that can facilitate logical and physical modeling of network equipment, in accordance with one or more embodiments. For purposes of brevity, description of like elements and/or processes employed in other embodiments is omitted. As depicted, system 200 includes model transforming component 126, model identifying component 124, logical inventory model 210, logical process model 220, and physical process model 230. Model identifying component 124 is depicted as identifying 212 logical process model 220 from logical inventory model 210, and model transforming component 126 is depicted as transforming 224 logical process model 220 into physical process model 230.

In one or more embodiments, logical inventory model 210 (also termed "inventory model" for some embodiments described herein) can correspond to an inventory of network equipment 180 and processes for utilizing network equipment. In one or more embodiments, logical inventory model 210 can be a model that includes information reflecting common inventory needs of telecommunications network operators. In some implementations, logical inventory model 210 can be a common information model that supports IT functions within telecommunications network. By modeling characteristics of, and relationships between, inventory items (e.g., network equipment 180), logical inventory model 210 can provide a common building block capability for implementing and maintaining elements of telecommunications networks. One aspect of one or more embodiments is the capability of normalizing disparate data models across a range of siloed applications.

In an example implementation, a request to establish enterprise-level Internet connectivity for a customer is identified. In this example, logical inventory model 210 can include data describing hardware and software elements associated with a variety of different requests, as well as business rules and processes for deploying and configuring required elements, e.g., business rules and processes for resource reservation and assignments, e.g., IP addresses, Virtual LANS (VLANS), interfaces used, ports allocated, etc.

In one approach to responding to the network equipment project request 135 for the Internet connectivity, model identifying component 124 can use the request to identify different parts of logical inventory model 210 that can be applicable to the request, e.g., different elements of Internet provisioning. Once identified, the data and processes associated with the request 135 can be represented by logical process model 220, e.g., with the 'process' corresponding to the process of responding to request 135.

In one or more embodiments, to implement the requirements of request 135, different physical (and virtual) resources of the network can be identified for use. One approach to identifying, reserving, and utilizing resources can transform 224 logical process model 220 into physical process model 230, e.g., by manipulating logical process model to map to existing resources, e.g., identified from other resources. In one or more embodiments, business rules and processes can be used to automate and standardize high-volume and/or complex network designs, e.g., Broadband fulfillment, IP virtual private network (VPN) fulfillment, etc.

Once physical process model 230 is generated to the response to request 135, provisioning component 128 can be used to reserve and configure network equipment for the response. To this end, a non-limiting characteristic of one or more embodiments is the specific configuration of embodiments to communicate according to a network communication protocol associated with a fifth generation communication network or a next generation communication network defined subsequent to the fifth generation communication network, e.g., a sixth generation network communication protocol associated with a sixth generation communication network.

Figure 3:
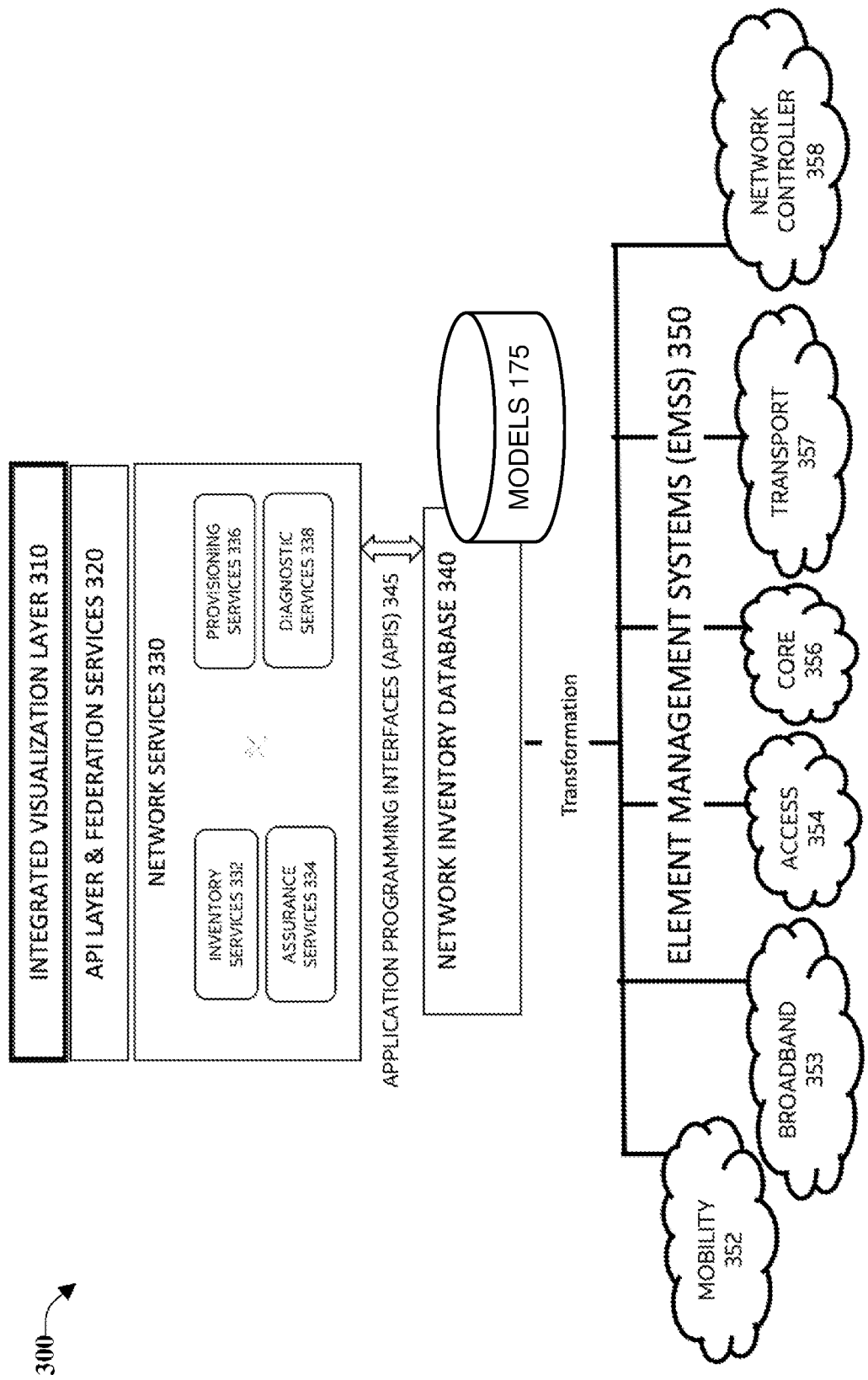
FIG. 3 is a layered architectural diagram of a non-limiting example system that can facilitate logical and physical modeling of network equipment, in accordance with one or more embodiments.

FIG. 3 is a layered architectural diagram of a non-limiting example system 300 that can facilitate logical and physical modeling of network equipment, in accordance with one or more embodiments. For purposes of brevity, description of like elements and/or processes employed in other embodiments is omitted. For purposes of brevity, description of like elements and/or processes employed in other embodiments is omitted.

As depicted, system 300 can include integrated visualization layer 310, API layer and federation services 320, network services layer 330 connected to network inventory database 340 (e.g., with models 175 as discussed herein) by APIs 345, and element management systems 350. Network services layer 330 can include inventory services 332, assurance services 334, provisioning services 336, and diagnostic services 338, and EMS 350 can integrate systems for mobility 352, broadband 353, access 354, core 356, transport 357, and network controller 358.

In one or more embodiments, FIG. 3 depicts functional layers that can provide user interface (e.g., integrated visualization layer 310), then use API layer and federation services 320 to exchange data with the user interface. API layer 320 can provide access to network services layer 330, including inventory services 332, assurance services 334, provisioning services 336, and diagnostic services 338. It should be appreciated that this layer, by integrating different network services, can reduce the need for maintaining isolated and static legacy systems. One or more embodiments can provide open APIs based on industry standards to support CRUD (e.g., Create, Read, Update, Delete) operations, including time-based commands for life cycle management.

EMS layer 350 can be used, by one or more embodiments, to access different telecommunications systems, e.g., to access, manipulate, and transform data from these systems with the integrated data from network services layers and models 175.

Figure 4:
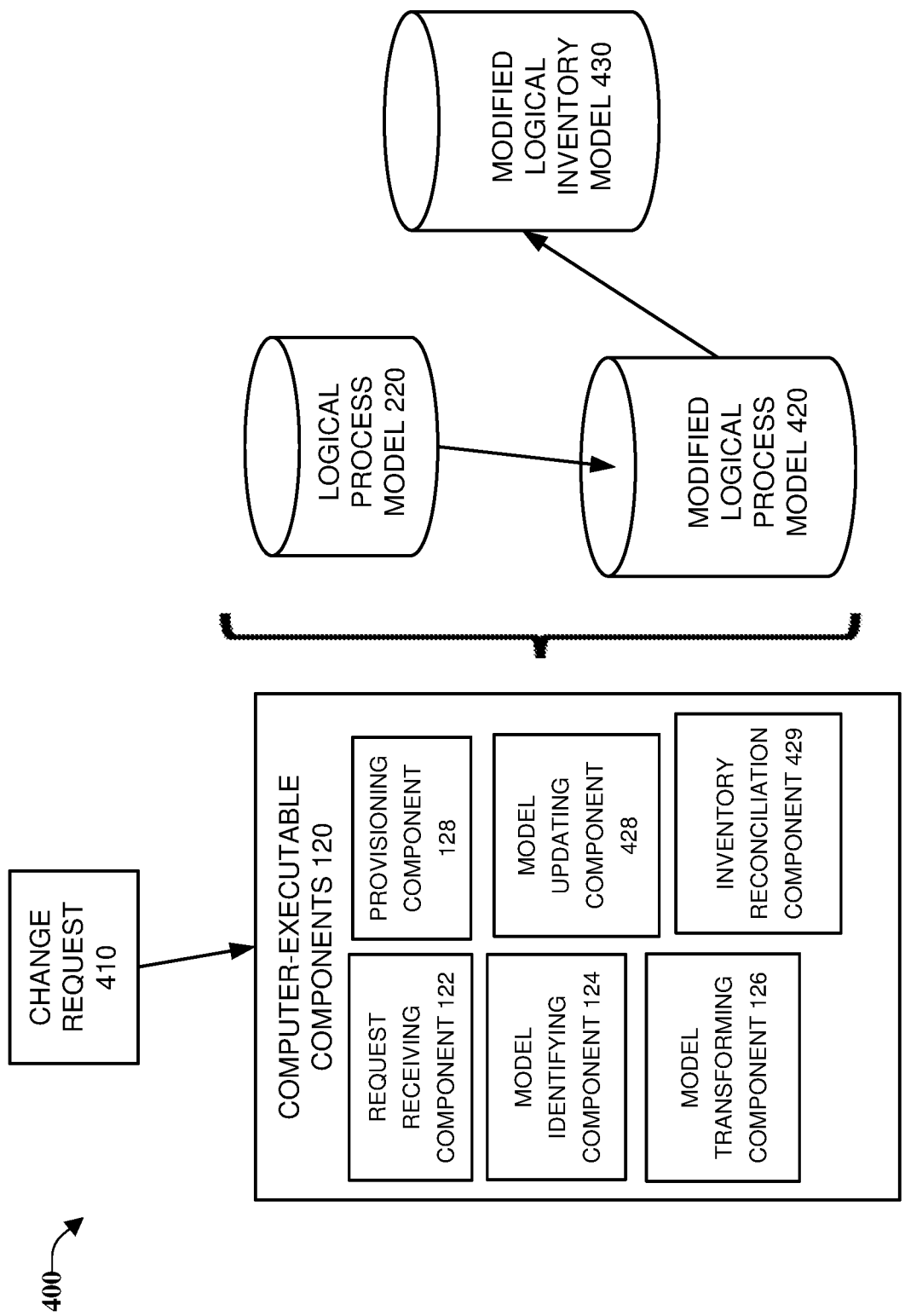
FIG. 4 is an architecture diagram of an example system that can facilitate logical and physical modeling of network equipment, in accordance with one or more embodiments.

FIG. 4 is an architecture diagram of an example system 400 that can facilitate logical and physical modeling of network equipment, in accordance with one or more embodiments. For purposes of brevity, description of like elements and/or processes employed in other embodiments is omitted. As depicted, computer executable components 120 can include request receiving component 122, model identifying component 124, model transforming component 126, and provisioning component 128, further including model updating component 428 and inventory reconciliation component 429.

In additional embodiments, computer executable components 120 can include instructions that, when executed by processor 160, can facilitate performance of operations defining model updating component 428. After one or more embodiments facilitate deploying the service equipment provisioned for the network equipment project, model updating component 428 can, in accordance with one or more embodiments, based on the logical process model and the deployed service equipment, discover service equipment specified for the network equipment project, e.g., providing real-time discovery of network inventory across multiple network domains, network function types and notification capabilities. In example embodiments, the discovered service equipment is discovered based on a characteristic that deviates from the logical process model Based on discovered resources, in one or more embodiments of model updating component 428 can modify the physical process model used to guide different services to incorporate the characteristic of the deployed service equipment, e.g., to facilitate further provisioning of the discovered network equipment for network equipment projects. Moreover, in other embodiments, model updating component 428 can update models 175 based on changes to the project request, e.g., via change request 410.

In additional embodiments, computer executable components 120 can further include instructions that, when executed by processor 160, can facilitate performance of operations defining inventory reconciliation component 429. In accordance with one or more embodiments, inventory reconciliation component 429 can, based on modified logical process model 420, modify logical inventory model 210 to incorporate the discovered resources, e.g., resulting in modified logical inventory model 430.

Figure 5:
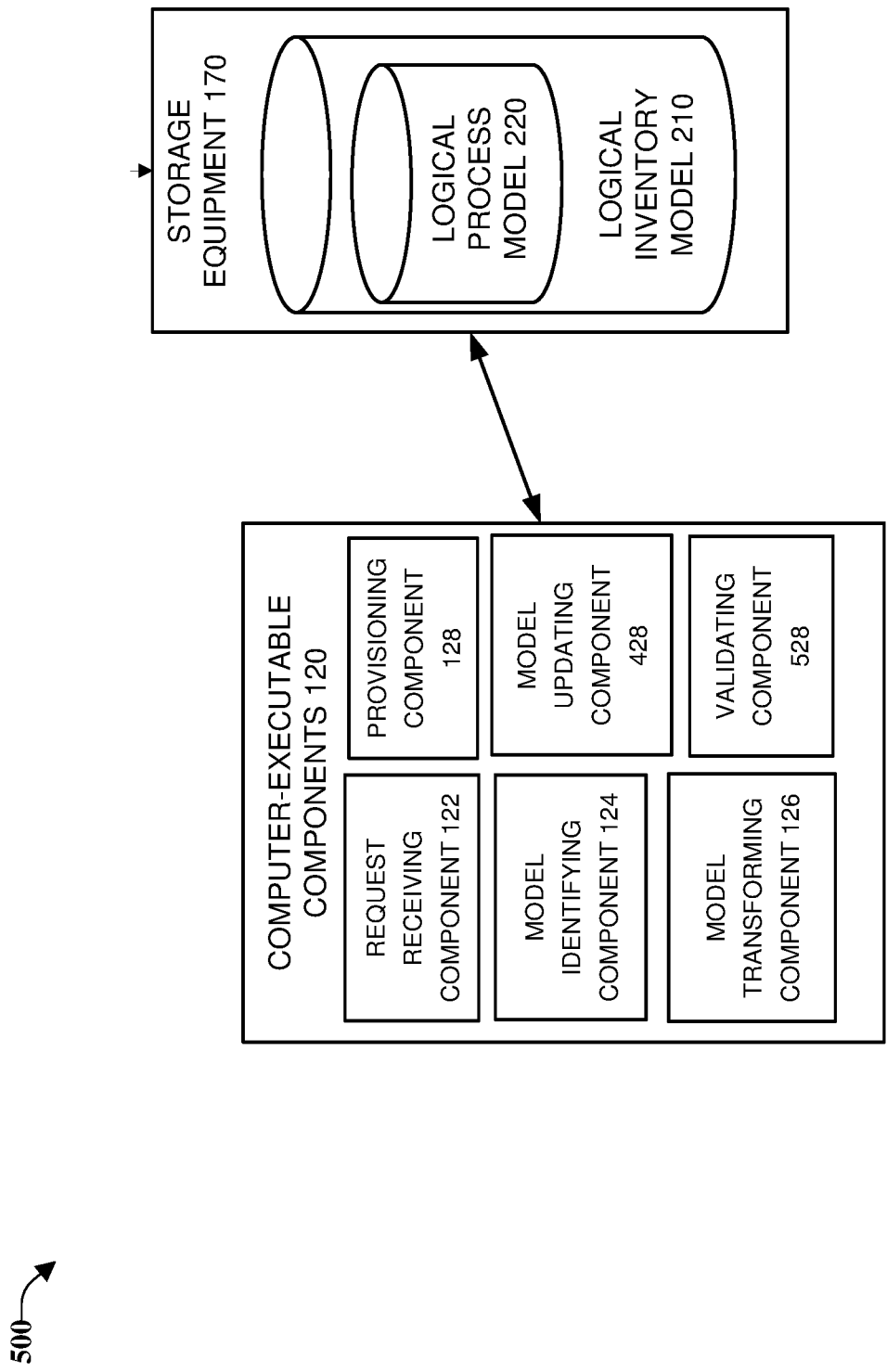
FIG. 5 is an architecture diagram of an example system that can facilitate logical and physical modeling of network equipment, in accordance with one or more embodiments.

FIG. 5 is an architecture diagram of an example system 500 that can facilitate logical and physical modeling of network equipment, in accordance with one or more embodiments. For purposes of brevity, description of like elements and/or processes employed in other embodiments is omitted.

As depicted, computer executable components 120 can include request receiving component 122, model identifying component 124, model transforming component 126, provisioning component 128, and model updating component 428, further including validating component 528. In additional embodiments, computer executable components 120 can include instructions that, when executed by processor 160, can facilitate performance of operations defining validating component 528.

In one or more embodiments, validating component 528 use logical inventory model 210 to define validations and concurrency checks for network resource reservation and assignments, along with providing auto-resolution of data discrepancies between the network and off-line inventory. For example, in one or more embodiments, a requested duration for completion of the network equipment project from request 135 can be compared to an estimated time for completion based on the logical process model identified for the response to request 135. In this example, validating component 528 can validate the requested time period by determining whether it is possible based on logical inventory model 210, and logical process model 220.

Figure 6:
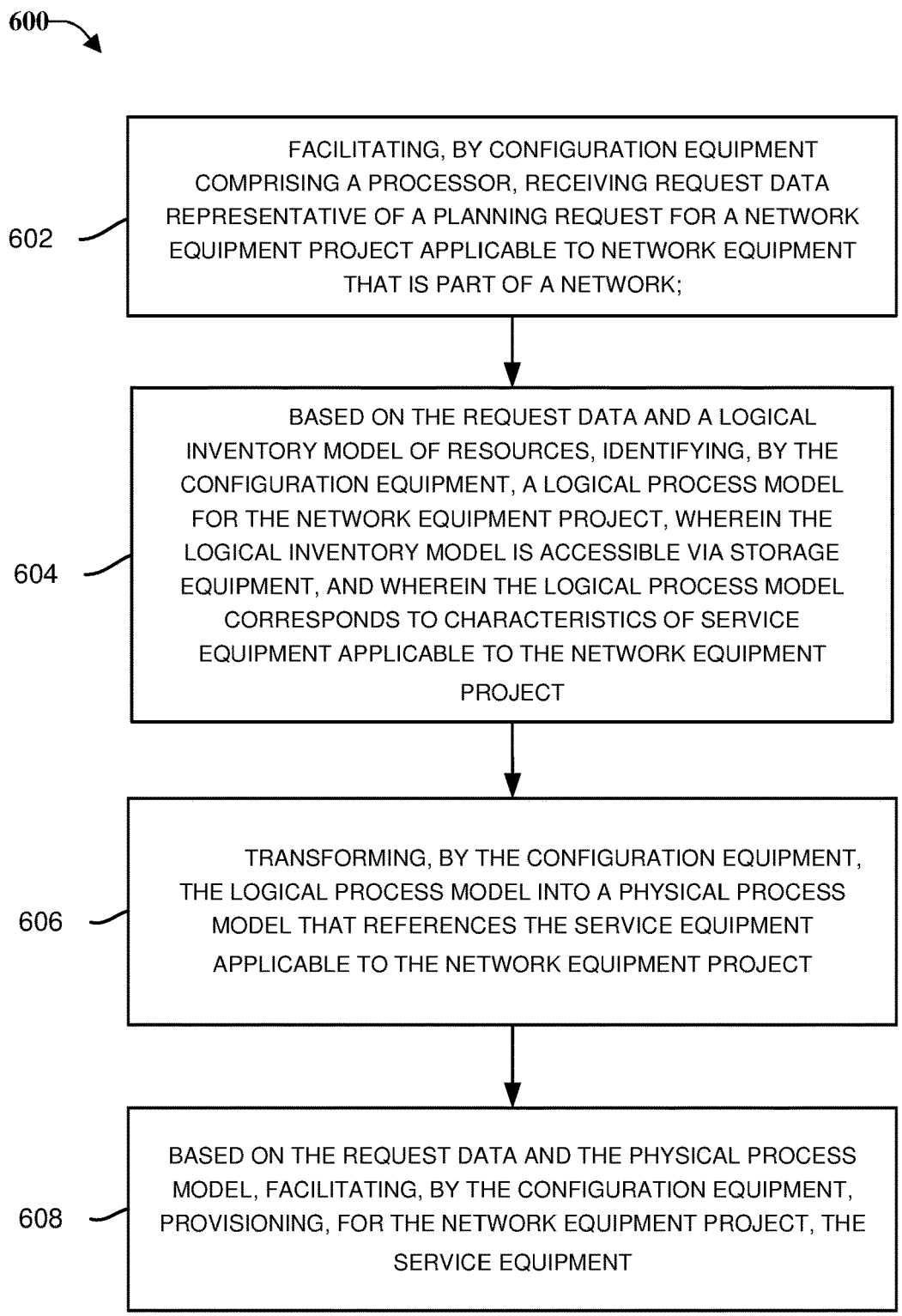
FIG. 6 is a diagram of a non-limiting example method that can facilitate provisioning network equipment based on logical and physical modeling, in accordance with one or more embodiments.

FIG. 6 is a diagram of a non-limiting example method 600 that can facilitate provisioning network equipment based on logical and physical modeling, in accordance with one or more embodiments. For purposes of brevity, description of like elements and/or processes employed in other embodiments is omitted.

It should be noted that, in one or more embodiments, system 100 and other embodiments described herein can employ hardware and/or software to solve problems that are highly technical in nature, including modeling complex hardware and software deployments. One having skill in the relevant art(s), given the disclosure herein, would appreciate that the technical problems that can be solved by one or more embodiments described herein are not abstract and cannot be performed as a set of mental acts by a human, e.g., in some circumstances updating complex models of network equipment based on detected changes to systems, e.g., based on change request 410.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to timing the performance of change procedures for systems where system functions are implemented with different redundant safeguards. System 100 and/or components of the system can be employed to use method 600 and other embodiments to solve new problems that arise through advancements in technologies mentioned above, computer architecture, and/or the like.

At 602, method 600 can include facilitating, by configuration equipment comprising a processor, receiving request data representative of a planning request for a network equipment project applicable to network equipment that is part of a network. For example, in one or more embodiments, method 600 can facilitate, by request receiving component 122 of configuration equipment 150, receiving request data representative of network equipment project request 135 applicable to network equipment 180 that is part of network 190.

At 604, method 600 can include, based on the request data and a logical inventory model of resources, identifying a logical process model for the network equipment project, with the logical inventory model being accessible via storage equipment, and where the logical process model corresponds to characteristics of service equipment applicable to the network equipment project. For example, in one or more embodiments, method 600 can, based on network equipment project request 135 and logical inventory model 210, identify logical process model 220 for the network equipment project (e.g., by model identifying component 124), with logical inventory model 210 being accessible via models 175 of storage equipment 170, and where logical process model 220 corresponds to characteristics of service equipment applicable to the network equipment project.

At 606, method 600 can include transforming, by the configuration equipment, the logical process model into a physical process model that references the service equipment applicable to the network equipment project. For example, in one or more embodiments, method 600 can transform (e.g., by model transforming component 126) logical process model 220 into physical process model 230 that references the service equipment 180 applicable to the network equipment project.

At 608, method 600 can include, based on the request data and the physical process model, facilitating, by the configuration equipment, provisioning, for the network equipment project, the service equipment. For example, in one or more embodiments, method 600 can, based on the request data and physical process model 230, facilitate provisioning (e.g., by provisioning component 128), for the network equipment project, service equipment 180.

Figure 7:
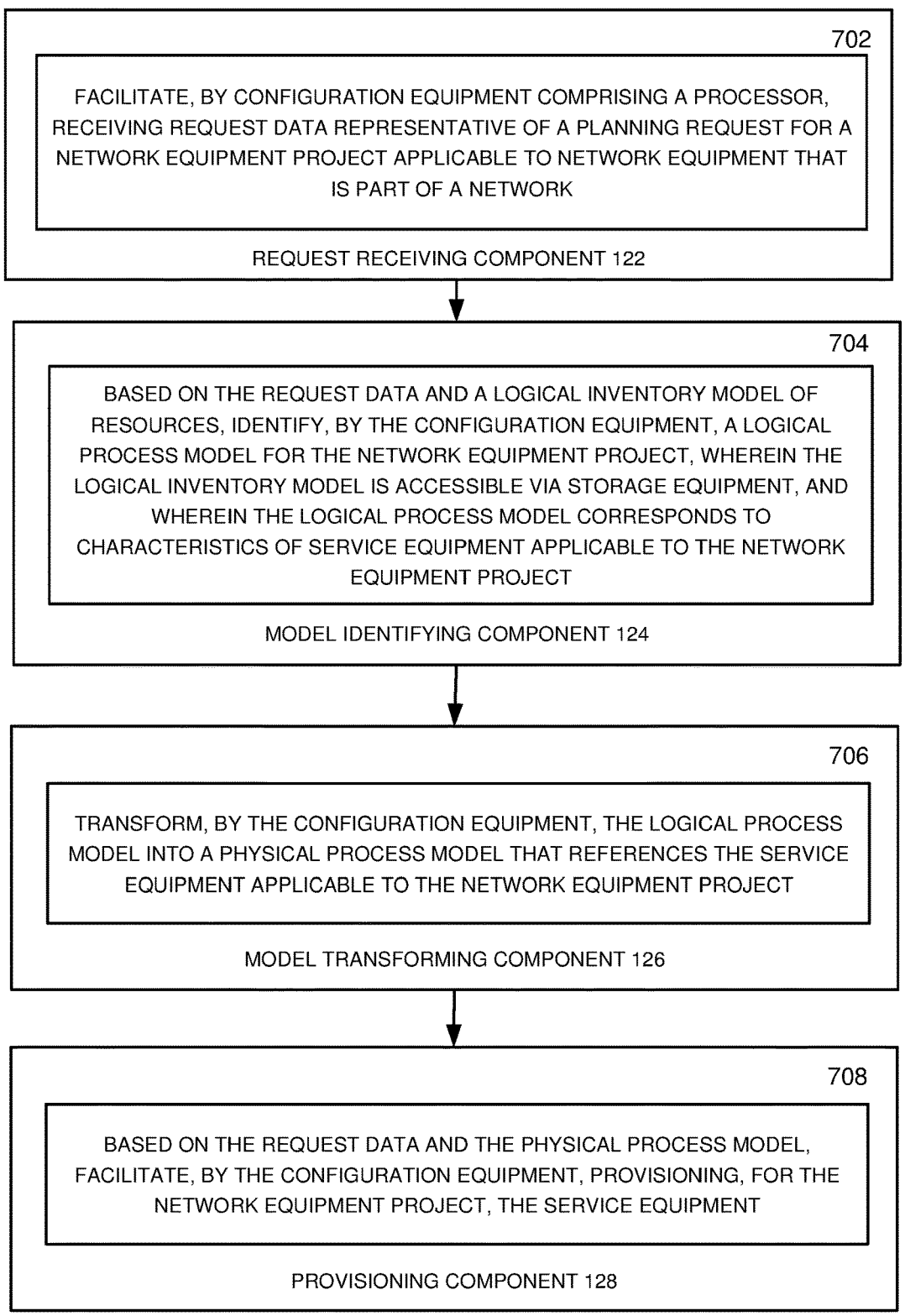
FIG. 7 depicts a system where one or more functions of configuration equipment can be implemented to facilitate provisioning network equipment based on logical and physical modeling.

FIG. 7 depicts a system 700 where one or more functions of configuration equipment 150 described above can be implemented, in accordance with one or more embodiments described above to facilitate provisioning network equipment based on logical and physical modeling. For purposes of brevity, description of like elements and/or processes employed in other embodiments is omitted.

In one or more embodiments, configuration equipment 150 can be implemented in a software platform that includes several interconnected components. As depicted, system 700 can include request receiving component 122, model identifying component 124, model transforming component 126, provisioning component 128, and other components described or suggested by different embodiments described herein.

In an example, component 702 can include the functions of request receiving component 122, supported by the other layers of system 700. For example, component 702 can facilitate, by configuration equipment comprising a processor, receiving request data representative of a planning request for a network equipment project applicable to network equipment that is part of a network.

Continuing this example, component 704 can include the functions of model identifying component 124, supported by the other layers of system 700. For example, component 704 can based on the request data and a logical inventory model of resources, identify, by the configuration equipment, a logical process model for the network equipment project, wherein the logical inventory model is accessible via storage equipment, and wherein the logical process model references the service equipment applicable to the network equipment project.

Further, component 706 can include the functions of model transforming component 126, supported by the other layers of system 700. For example, component 706 can transform, by the configuration equipment, the logical process model into a physical process model that references the service equipment applicable to the network equipment project. In the example, component 708 can include the functions of provisioning component 128, supported by the other layers of system 700. For example, component 708 can based on the request data and the physical process model, facilitate, by the configuration equipment, provisioning, for the network equipment project, the service equipment.

Figure 8:
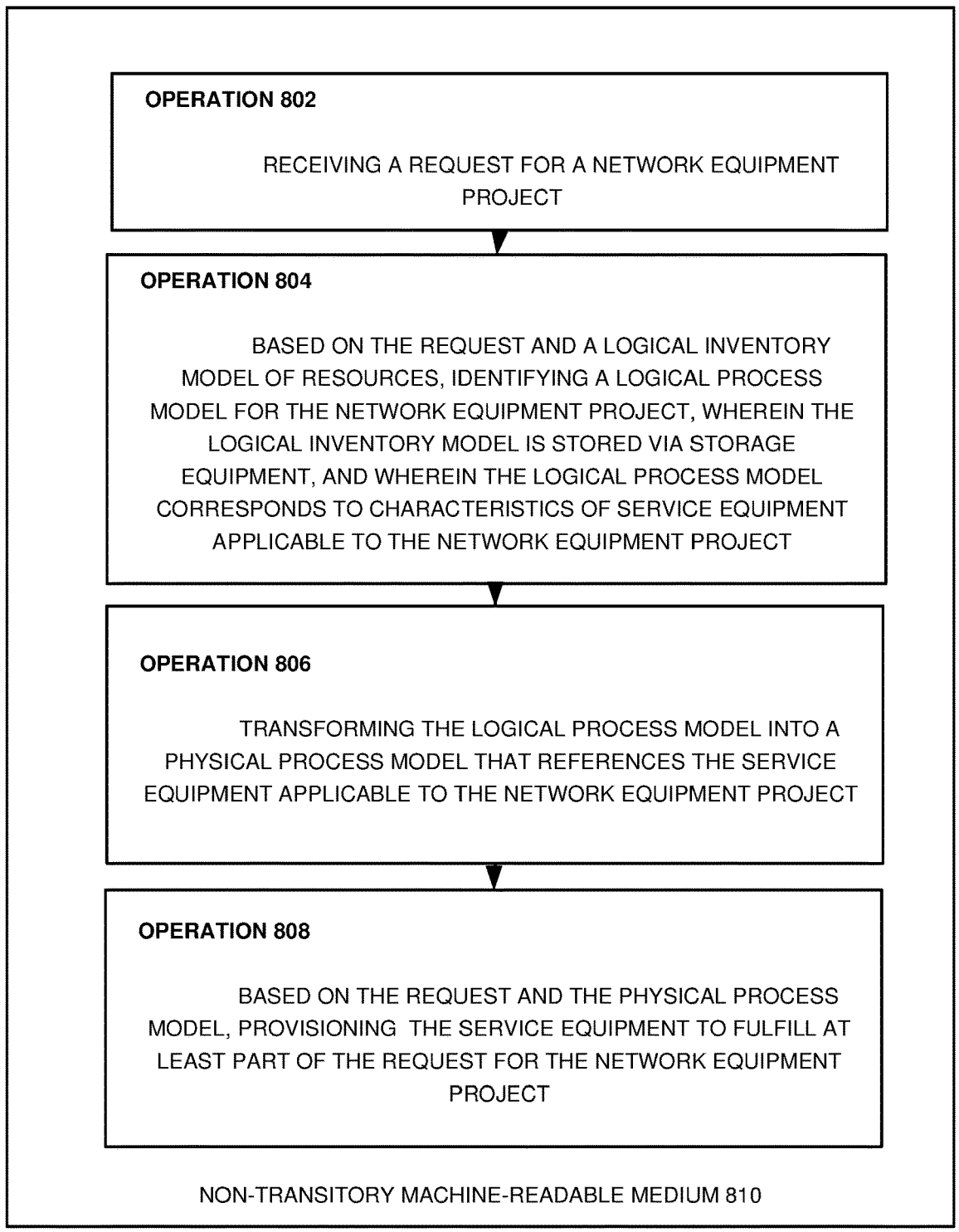
FIG. 8 depicts an example non-transitory machine-readable medium that can include executable instructions that, when executed by a processor of a system, facilitate provisioning network equipment based on logical and physical modeling, in accordance with one or more embodiments.

FIG. 8 depicts an example 800 non-transitory machine-readable medium 810 that can include executable instructions that, when executed by a processor of a system, facilitate provisioning network equipment based on logical and physical modeling, in accordance with one or more embodiments described above. For purposes of brevity, description of like elements and/or processes employed in other embodiments is omitted.

As depicted, non-transitory machine-readable medium 810 includes executable instructions that can facilitate performance of operations 802-806. In one or more embodiments, the operations can include operation 802 that can receive a request for a network equipment project. Operation 804 can, based on the request and a logical inventory model of resources, identify a logical process model for the network equipment project, wherein the logical inventory model is stored via storage equipment, and wherein the logical process model corresponds to characteristics of service equipment applicable to the network equipment project. Operation 806 can transform the logical process model into a physical process model that references the service equipment applicable to the network equipment project. Operation 808 can, based on the request and the physical process model, provision the service equipment to fulfill at least part of the request for the network equipment project.

Figure 9:
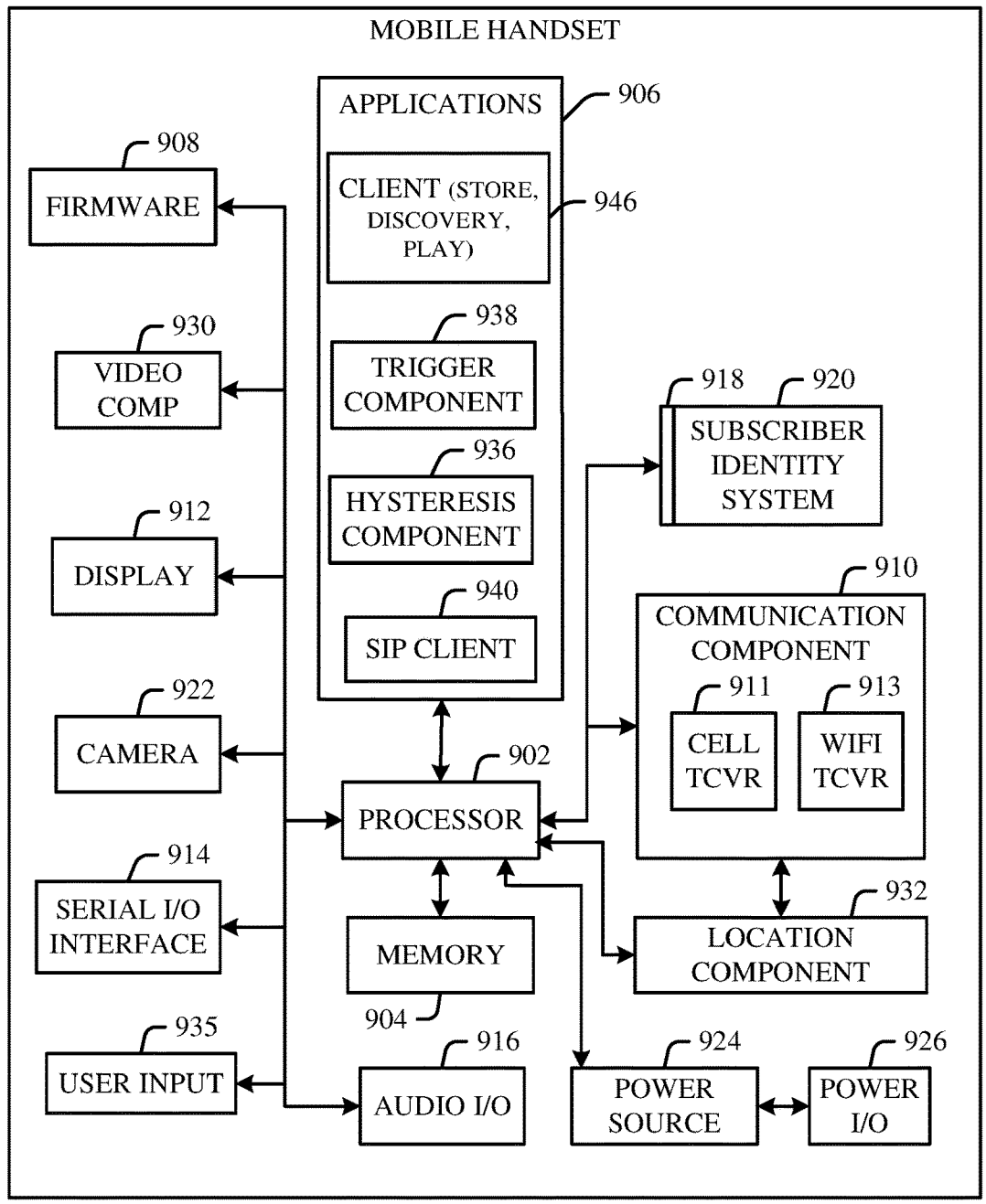
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 913 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipments operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
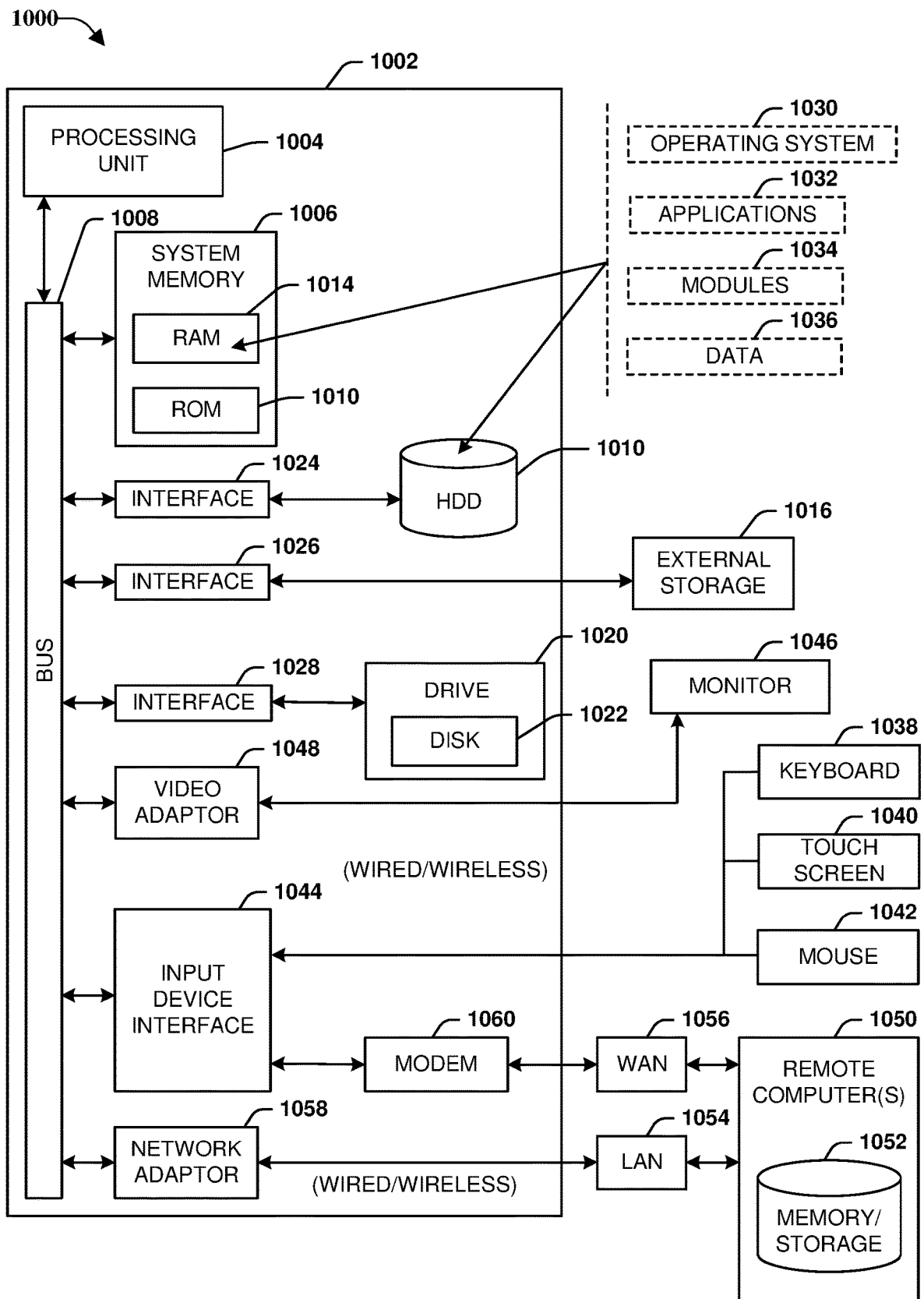
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 10 depicts an example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1014 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB), ROM base address (RBA), and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH¬Æ interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH¬Æ wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE) or 5G; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   facilitating, by configuration equipment comprising a processor, receiving request data representative of a planning request for a network equipment project applicable to network equipment that is part of a network, wherein the planning request comprises a first time period comprising a requested duration for completion of the network equipment project;
   based on the request data and a logical inventory model of resources, identifying, by the configuration equipment, a logical process model for the network equipment project, wherein the logical inventory model is accessible via storage equipment, wherein the logical process model corresponds to characteristics of service equipment applicable to the network equipment project, and wherein the logical process model comprises a second time period comprising an estimated time for completion determined based on the logical inventory model;
   based on the second time period and a validation criterion, comparing, by the configuration equipment, the first time period to the second time period to validate the first time period by determining whether completion of the network equipment project in the requested duration is possible based on the logical inventory model and the logical process model, wherein the validation criterion comprises a concurrency check for network resource reservation, and wherein the network resource reservation for which the concurrency check is made relates to an IP address;
   transforming, by the configuration equipment, the logical process model into a physical process model that references the service equipment applicable to the network equipment project;
   based on the request data and the physical process model, facilitating, by the configuration equipment, provisioning, for the network equipment project, the service equipment;
   facilitating, by the configuration equipment, deploying the service equipment provisioned for the network equipment project, resulting in deployed service equipment;
   based on the logical process model and the deployed service equipment, discovering, by the configuration equipment, a group of deployed service equipment with a characteristic that deviates from the logical process model; and
   modifying, by the configuration equipment, the physical process model to incorporate the characteristic that had deviated.

2. The method of claim 1, wherein the logical inventory model corresponds to an inventory of equipment configured to communicate according to a network communication protocol associated with a fifth generation communication network or a next generation communication network defined subsequent to the fifth generation communication network.

3. The method of claim 2, wherein the logical inventory model corresponds to a relationship applicable to the inventory of equipment.

4. The method of claim 2, wherein the logical inventory model further corresponds to a relationship between the network equipment project and the inventory of equipment.

5. The method of claim 1, wherein the physical process model references a physical location and an availability of the service equipment.

6. The method of claim 1, further comprising, based on a change request for the network equipment project, modifying, by the configuration equipment, the logical process model resulting in a modified logical process model.

7. The method of claim 6, further comprising, based on the modified logical process model, modifying, by the configuration equipment, the logical inventory model.

8. The method of claim 1, wherein the physical process model comprises virtual service elements and physical service elements.

9. Storage equipment, comprising:
a processor; and
a memory that stores executable instructions that, when executed by the processor, facilitate performance of operations, comprising:
receiving, from configuration equipment, request data representative of a planning request for a network project, wherein the planning request comprises a first time period comprising a requested duration for completion of the network project;
based on the request data and an inventory model of resources, identifying a project model for the network project, wherein the project model corresponds to characteristics of service equipment applicable to the network project, and wherein the project model comprises a second time period comprising an estimated time for completion determined based on the inventory model;
based on the second time period and a validation criterion, comparing the first time period to the second time period to validate the first time period by determining whether completion of the network project in the requested duration is possible based on the inventory model and the project model, wherein the validation criterion comprises a concurrency check for network resource reservation, and wherein the network resource reservation for which the concurrency check is made relates to an interface that is used;
transforming the project model into an equipment model mapped to characteristics of the service equipment applicable to the network project;
based on the request data and the equipment model, generating a configuration message for the configuration equipment, usable to facilitate a provisioning of the service equipment;
facilitating, by the configuration equipment, deploying the service equipment provisioned for the network project, resulting in deployed service equipment;
based on the project model and the deployed service equipment, discovering, by the configuration equipment, a group of deployed service equipment with a characteristic that deviates from the project model; and
modifying, by the configuration equipment, the equipment model to incorporate the characteristic that had deviated.

10. The storage equipment of claim 9, wherein the inventory model corresponds to an inventory of equipment that are configured to communicate according to a fifth generation network communication protocol associated with a fifth generation communication network or a sixth generation network communication protocol associated with a sixth generation communication network.

11. The storage equipment of claim 10, wherein the inventory model corresponds to a relationship that implicates at least part of the inventory of equipment.

12. The storage equipment of claim 11, wherein the at least the part of the inventory of equipment is at least a first part, wherein the relationship is a first relationship, and wherein the inventory model corresponds to a second relationship between the network project and at least a second part of the inventory of equipment.

13. The storage equipment of claim 9, wherein the equipment model comprises references to respective physical locations and respective availabilities of the service equipment.

14. The storage equipment of claim 9, wherein the operations further comprise, based on a change request for the network project, modifying, by the configuration equipment, the project model resulting in a modified project model.

15. The storage equipment of claim 14, wherein the operations further comprise, based on the modified project model, modifying, by the configuration equipment, the inventory model.

16. A non-transitory machine-readable medium, comprising executable instructions that, when executed by a processor of a configuration system, facilitate performance of operations, comprising:
receiving a request for a network equipment project, wherein the request comprises a first time period comprising a requested duration for completion of the network equipment project;
based on the request and a logical inventory model of resources, identifying a logical process model for the network equipment project, wherein the logical inventory model is stored via storage equipment, wherein the logical process model corresponds to characteristics of service equipment applicable to the network equipment project, and wherein the logical process model comprises a second time period comprising an estimated time for completion determined based on the logical inventory model;
based on the second time period and a validation criterion, comparing the first time period to the second time period to validate the first time period by determining whether completion of the network equipment project in the requested duration is possible based on the logical inventory model and the logical process model, wherein the validation criterion comprises a concurrency check for network resource assignments, and wherein the network resource assignments for which the concurrency check is made relate to a port that is allocated;
transforming the logical process model into a physical process model that references the service equipment applicable to the network equipment project;
based on the request and the physical process model, provisioning the service equipment to fulfill at least part of the request for the network equipment project;
facilitating deploying the service equipment provisioned for the network equipment project, resulting in deployed service equipment;
based on the logical process model and the deployed service equipment, discovering a group of deployed service equipment with a characteristic that deviates from the logical process model; and
modifying the physical process model to incorporate the characteristic that had deviated.

17. The non-transitory machine-readable medium of claim 16, wherein the physical process model references a physical location and an availability of the service equipment.

18. The non-transitory machine-readable medium of claim 16, wherein the operations further comprise, based on a change request for the network equipment project, modifying the logical process model resulting in a modified logical process model.

19. The non-transitory machine-readable medium of claim 16, wherein the logical inventory model corresponds to an inventory of equipment configured to communicate according to a network communication protocol associated with a fifth generation communication network or a next generation communication network defined subsequent to the fifth generation communication network.

20. The non-transitory machine-readable medium of claim 18, wherein the operations further comprise modifying the logical inventory model.

* * * * *